US005630361A

United States Patent [19]

Van Pay et al.

[11] Patent Number: 5,630,361

[45] Date of Patent: May 20, 1997

[54] SANITARY WEAR BUTTON

[75] Inventors: Stephen J. Van Pay; Thomas L. Niermann, both of Green Bay; Blake A. Halderson, Valders, all of Wis.

[73] Assignee: Stoelting, Inc., Kiel, Wis.

[21] Appl. No.: 528,017

[22] Filed: Sep. 14, 1995

[30] Foreign Application Priority Data

Oct. 28, 1994 [JP] Japan .................................... 6-265330

[51] Int. Cl.[6] ............................ A01J 11/06; A01J 25/00; A01J 25/11; A23C 19/00

[52] U.S. Cl. ................................ 99/454; 99/452; 99/456; 99/458; 99/460; 428/595; 428/598

[58] Field of Search .............................. 99/452–461, 465; 100/104, 125–127; 141/84, 145, 367; 206/405, 406; 425/85, 147, 308, 444; 426/478, 486, 491, 517, 36; 428/595, 598, 192, 220, 53, 58

[56] References Cited

U.S. PATENT DOCUMENTS

| | | | |
|---|---|---|---|
| 3,833,031 | 9/1974 | Fechheimer | 141/145 X |
| 3,969,995 | 7/1976 | Krueger et al. | 99/458 |
| 4,018,145 | 4/1977 | Hensel | 99/458 |
| 4,157,680 | 6/1979 | Charles | 100/125 |
| 4,244,286 | 1/1981 | Rust | 99/459 |
| 4,436,518 | 3/1984 | Buss | 428/598 X |
| 4,520,969 | 6/1985 | Wulfing et al. | 242/608.3 |
| 4,564,156 | 1/1986 | Cybulski | 242/612 |
| 4,752,046 | 6/1988 | Wulfing | 206/405 X |
| 5,001,972 | 3/1991 | Greenfield et al. | 99/454 |
| 5,177,656 | 1/1993 | Hughes | 360/133 |
| 5,496,598 | 3/1996 | Delisle et al. | 428/595 X |
| 5,536,547 | 7/1996 | Simpson | 428/53 |

*Primary Examiner*—Timothy F. Simone
*Attorney, Agent, or Firm*—Whyte Hirschboeck Dudek S.C.

[57] ABSTRACT

The present invention provides a plurality of two piece wear buttons that insert into the blade of a guillotine and protect the surface of the guillotine as it slide in U-shaped channels within a cheese block forming unit. Each wear button comprises a male portion and a female portion, each portion configured to fit into opposite sides of a through bore drilled in the surface of the guillotine blade. The male portion is provided with an outwardly tapered extension or neck which snaps into an inwardly tapered recess defined within a cylindrical member on the female portion of the button. Each portion is also provided with a lip such that when the male portion and the female portion are joined together within the through bore, the lips overlay the through bore and inhibits product from seeping into the through bore.

10 Claims, 2 Drawing Sheets

SANITARY WEAR BUTTON

BACKGROUND OF THE INVENTION

1. Field of the Invention

The present invention relates generally to food processing, and more particularly to a sanitary wear button which can be incorporated into devices that form cheese blocks through the compression of cheese curd.

2. Description of the Prior Art

One method of forming natural cheese is through the compression of cheese curd under its own weight in a tubular column. Specifically, curd is directed to a drain table or drain belt where most of the whey drains off such that a matt of curd is formed. The matt is cut up into small pieces or broken up into granular form, and then it is subsequently mixed with salt or other additives to provide flavoring and to extract residual whey. Once the desired flavor has been achieved, the curd is introduced into a perforated tubular column supported within a chamber under vacuum, such that a pillar of curd is formed within the tubular column. The vacuum functions to draw the cheese curd into the chamber from the drain table. Additionally, the vacuum serves to compact the cheese in the tubular column, and to draw additional whey out of and away from the forming pillar of cheese curd. As the height of the pillar of curd increases within the tubular column, the curd in the lower portion of the pillar is compressed by the weight of superimposed curd such that additional whey is pressed out of the pillar and the curd is consolidated into a cheese pillar. The cheese pillar is then lowered through an opening in the bottom of the column and a knife blade or guillotine located adjacent the bottom of the tubular column is activated to cut the cheese pillar into blocks as the pillar is lowered out of the column.

The guillotine is linearly movable between a closed position which closes the opening in the bottom of the column and an open position in which the bottom of the column is open to allow the cheese pillar to pass through. The guillotine comprises a stainless steel blade which slides in plastic, U-shaped channels adjacent the opening in the bottom of the column. The guide channels are attached within a chamber such that the cheese cutting process can be carried out under sanitary conditions. A pneumatic cylinder or similar device is used to actuate the blade.

Stainless steel components have a tendency to scratch when in sliding contact with other stainless steel components. In the food industry, these scratches can serve as sites for the formation and growth of bacteria which can result in contamination of the cheese blocks. To inhibit the formation and growth of bacteria in this manner, the United States Department of Agriculture has required that metal to metal interfaces such as these be separated by a wear strip or similar article. With respect to a guillotine blade which slides in channels within a cheese block former, the solution which is currently the standard in the industry is to line the inner surface of each U-shaped channel with a gasket. Typically, these gaskets are formed of rubber and glued into place. Although gaskets such as these are acceptable in preventing contact between the blade and the channels, the gaskets eventually wear out or become damaged due to the friction between the gaskets and the blade. Replacement of these gaskets usually entails disassembly of the cheese block former to a point where the U-shaped channels are accessible. In many cases, disassembly requires removal of the entire tower portion of the cheese block former. Once the channels are accessible, the gaskets can be replaced. Because the gaskets are glued into place, removal generally requires burning or buffing out glue residue before new gaskets are attached. In any event, the entire process of breaking down the cheese block former and replacing worn out gaskets can result in a down time of three to four days.

Therefore, it would be desirable to provide an apparatus for preventing contact between sliding portions of a food processing device without the need for a gasket which must be glued or otherwise attached and which can only be replaced through significant downtime of the device. The apparatus should be configured to be installed without the need for glue or other similar attachment compound. Downtime for replacement of the device should be minimized. The apparatus should also be configured so as not to serve as a site for the formation and growth of bacteria or other substances which can contaminate food substances.

SUMMARY OF THE INVENTION

These objectives are achieved in the present invention which provides a plurality of two piece wear buttons that insert into the blade of a guillotine and protect the surface of the guillotine as it slide in U-shaped channels within a cheese block forming unit. Each wear button comprises a male portion and a female portion, each portion configured to fit into opposite sides of a through bore drilled in the surface of the guillotine blade. The male portion is provided with an outwardly tapered extension or neck which snaps into an inwardly tapered recess defined within a cylindrical member on the female portion of the button. Each portion is also provided with a lip such that when the male portion and the female portion are joined together within the through bore, the lips overlay the through bore and inhibits product from seeping into the through bore.

BRIEF DESCRIPTION OF THE DRAWINGS

In the drawings which illustrate that which is presently regarded as the best modes for carrying out the invention.

DESCRIPTION OF THE PREFERRED EMBODIMENTS

In the detailed description of this invention, like numerals are employed to designate like parts throughout the same. Various items of equipment, such as fasteners, fittings, etc., are omitted so as to simplify the description. However, those skilled in the art will realize that such conventional equipment can be employed as desired.

Figure 1:
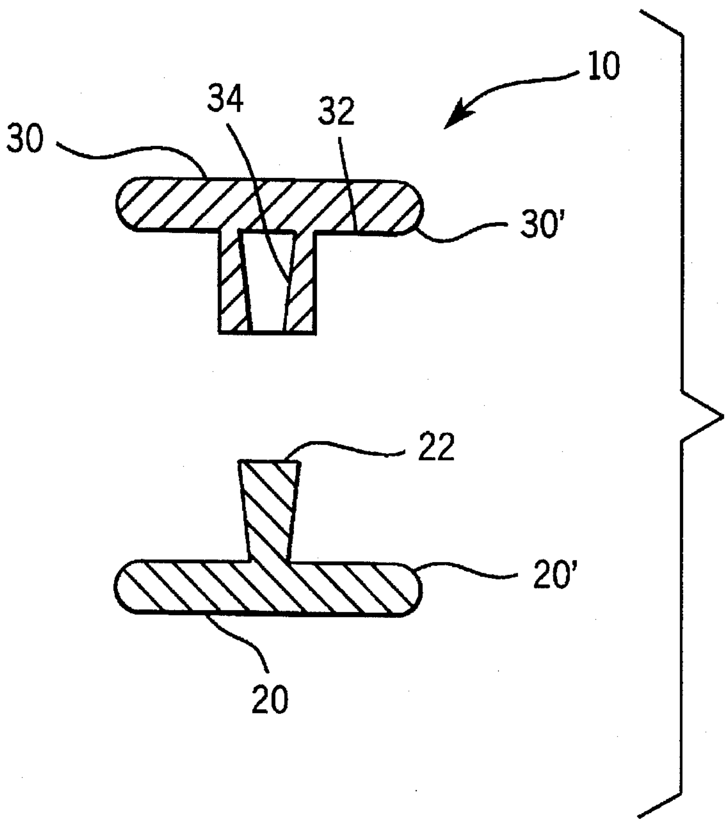
FIG. 1 illustrates an exploded, sectional side view of the wear button.
Figure 2:
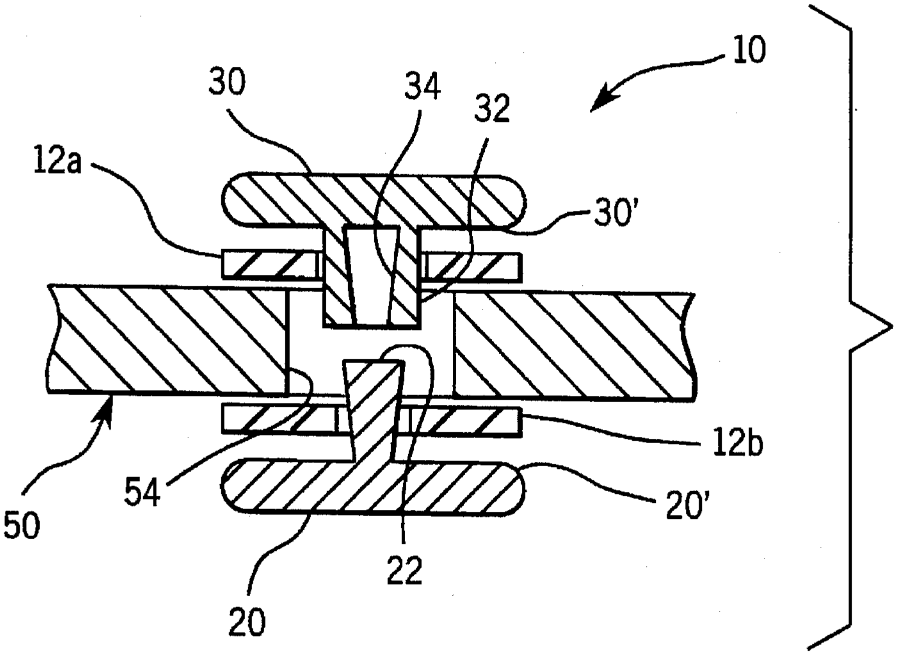
FIG. 2 illustrates an exploded, sectional side view of the wear button inserted into a guillotine blade.

In FIG. 1, a preferred embodiment of the invention is shown and generally designated as wear button 10. Wear button 10 is comprised of a male portion 20 and a female portion 30. Male portion 20 is defined by an inwardly tapered member 22 which tapers from a larger diameter at its distal end to a smaller diameter at its base. Female portion 30 is defined by a cylindrical member 32 which has a tapered recess 34 extending axially therein. The diameter of tapered recess 34 is narrowest at the surface of cylindrical member 32 and gradually increases as recess 34 extends down into cylindrical member 32. Both male portion 20 and female portion 30 are also provided with a lip 20', 30'. FIG. 2 illustrates wear button 10 as it would typically be inserted into a through bore 54 of a guillotine blade 50.

Figure 3:
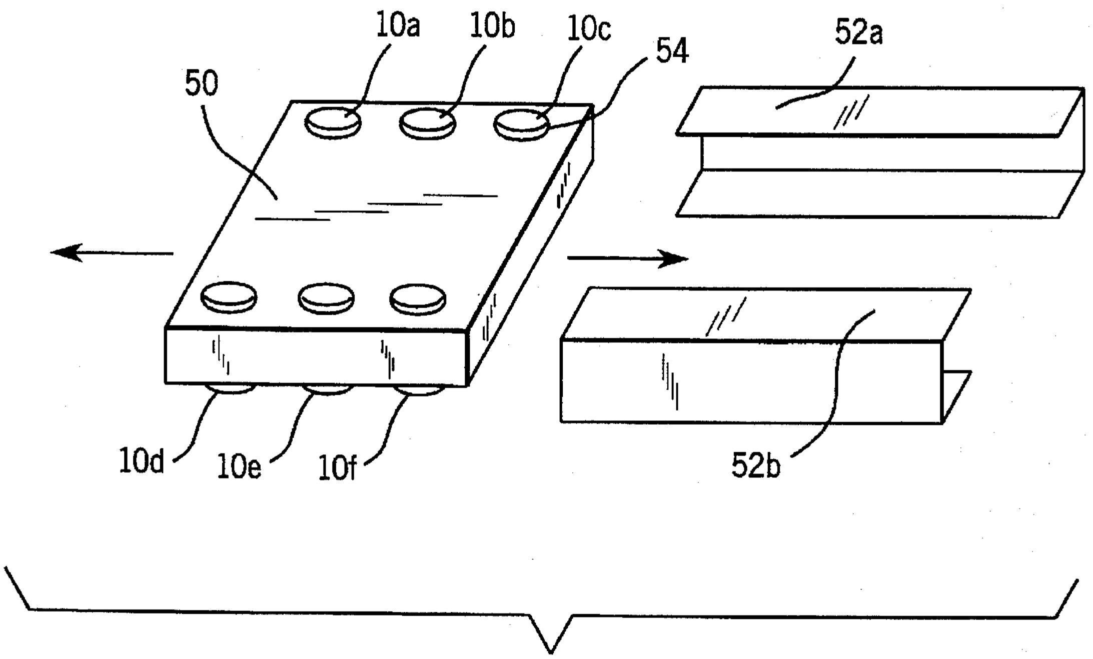
FIG. 3 illustrates placement of the buttons along the length of the blade.

With reference to FIG. 3, a cheese block former (not shown) comprises in part guillotine blade 50 and a pair of opposing, U-shaped channels 52*a*, 52*b*. Channels 52*a*, 52*b* function to guide and support blade 50 in its linear movement within a cheese block former. Blade 50 is also provided with a plurality of through bores 54 disposed along those edges of blade 50 which are adjacent to channels 52*a*, 52*b*. Inserted in each through bore 54 is a button 10 such that buttons 10*a*, 10*b*, 10*c*, 10*d*, 10*e*, 10*f* prevent contact between blade 10 and channels 52*a*, 52*b* during the operation of blade 10. Those skilled in the art will understand that the number of buttons 10 and their spacing along the edge of blade 50 will vary depending on the physical characteristics of blade 10 such as dimensions of blade 10.

Turning back to FIG. 2, female portion 30 and male portion 20 are inserted into opposing entrances of through bore 54 so that the tapered recess 34 of female portion 30 is disposed to receive tapered member 22 of male portion 20. Tapered member 22 is urged into tapered recess 34 until the two portions snap together and the lips 20', 30' of the opposing portions are seated flush against the surface of blade 50, inhibiting food product from seeping into bore 40. In the preferred embodiment, female portion 30 is inserted into through bore 54 so that tapered recess 34 is oriented to inhibit food product from collecting in tapered recess 34. For example, if blade 50 is disposed horizontally, female portion 30 should be inserted in through bore 54 to be flush with the upper surface of blade 50 so that gravity will cause fluid or food products to drain out of tapered recess 34. To remove button 10 from through bore 54, a thin edge such as a tempered knife blade (not shown) is inserted under either lip 20' or lip 30' and a force is applied to lift the lip away from blade 50 such that male portion 20 and female portion 30 disengage. The removal and replacement of button 10 can be accomplished in minutes by simply accessing the surface of blade 50 and does not require the disassembly of the device with which blade 50 is used.

The preferred taper diameter of tapered member 22 is slightly larger than the taper diameter of tapered recess 34 so that male portion 20 forms a compression fit with female portion 30. Additionally, the diameter of cylindrical member 32 is slightly smaller than through bore 54 so that the walls defining cylindrical member 32 will be forced radially outward when tapered member 22 is seated within tapered recess 34. In forcing the walls defining cylindrical member 32 out against through bore 54, button 10 fits tightly within through bore 54, further inhibiting food product from seeping between the interface of bore 54 and button 10.

In another embodiment, gaskets 12*a*, 12*b* (FIG. 2) may also be provided to enhance sealing of button 10 in through bore 54. Although not intended as a limitation, the preferred materials for construction of button 10 should resist wear while at the same time exhibit sufficient anti-friction properties to allow blade 50 to slide easily within channels 52*a*, 52*b*, for example, a nylon or urethane.

Figure 4:
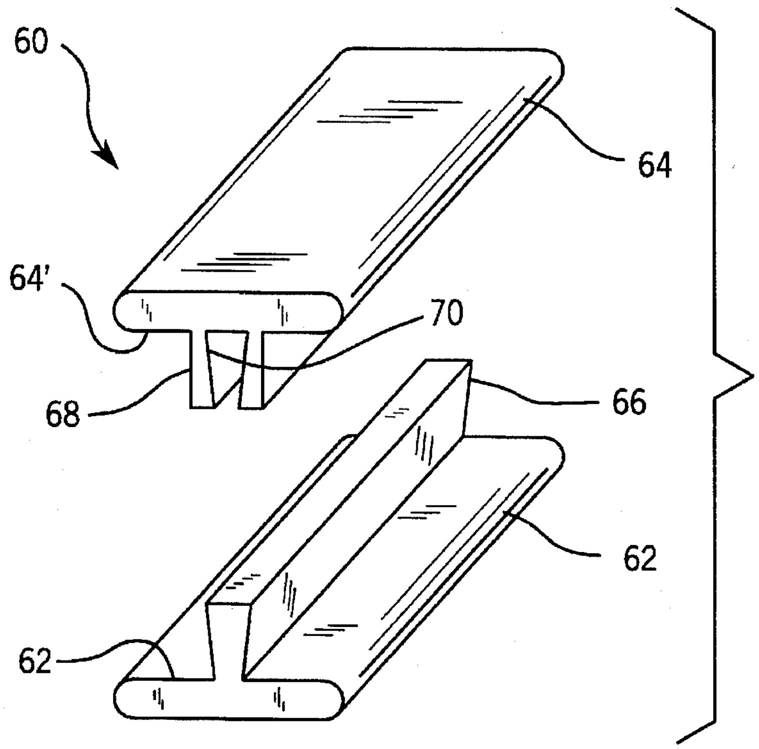
FIG. 4 illustrates another embodiment of the invention in which an elongated wear strip replaces the button of FIG. 1.

Although wear button 10 has been described as cylindrical in the preferred embodiment, other geometric configurations are contemplated without departing from the spirit of the invention. For example, as is shown in FIG. 4, a wear strip 60 is contemplated for insertion into an elongated groove (not shown) in blade 50 rather than a through bore 54. Similar to wear button 10, wear strip 60 is comprised of an elongated male portion 62 and an elongated female portion 64. Male portion 62 is defined by an inwardly tapered member 66 which tapers from a larger diameter at its distal end to a smaller diameter at its base. Member 66 runs along the length of male portion 62. Female portion 64 is defined by elongated member 68 which has a recess 70 extending axially therein along the length of member 68. The width of recess 70 is tapered such that recess 70 is narrowest at the surface of member 68 and gradually increases as recess 70 extends down into member 68. Both male portion 62 and female portion 64 are also provided with a lip 62', 64' which abut the surface of guillotine blade 50 (not shown) when wear strip 60 is inserted into blade 50.

The present invention has several distinct advantages over the prior art, the primary one being that the two-piece wear buttons are easily inserted and removed from the guillotine blade without the need to disassemble the device with which the blade is used. Therefore, the down time for replacement of the wear buttons is significantly shorter than replacement of the wear strips of the prior art. Additionally, the wear buttons of the present invention do not require any type of adhesive to fix them in place, and as a result, the expensive and undesirable process of removing old adhesive during the replacement of the prior art wear strips is avoided.

Finally, the wear button and wear strip of the present invention have been described with respect to guillotine blades as used in cheese block formers. However, those skilled in the art will understand that the wear button and wear strip described above can function equally well in other types of food processing devices in which moving parts are likely to be in sliding or moving contact with one another.

Although the invention has been described in considerable detail through the figures and above discussion, many variations and modifications can be made by one skilled in the art without departing from the spirit and scope of the invention as described in the following claims.

What is claimed is:

1. A wear button comprising:

a. a first portion comprising a lip and a neck having a distal end and a proximal end, said neck tapering from a larger diameter at its distal end to a smaller diameter at its proximal end; and b. a second portion comprising a lip and a projecting member having a distal end and a proximal end, said member defining a recess therein in which said recess tapers along the length of said member from a smaller diameter at the distal end of said member to a larger diameter at the proximal end of said member, wherein the proximal end of said neck of said first portion seats in the recess defined within said second portion.

2. The wear button of claim 1 wherein the taper of said neck is larger than the taper of said recess.

3. A wear button comprising:

a. a first portion comprising a lip and a neck having a distal end and a proximal end; and b. a second portion comprising a lip and a cylindrical member having a distal end and a proximal end, said cylindrical member defining a recess therein, wherein the proximal end of said neck of said first portion seats in the recess defined within said second portion.

4. The wear button of claim 3 in which said neck of said first portion tapers from a larger diameter at the distal end of said neck to a smaller diameter at the proximal end of said neck.

5. The wear button of claim 3 in which said recess within said cylindrical member tapers along the length of said cylindrical member from a smaller diameter at the distal end of said cylindrical member to a larger diameter at the proximal end of said cylindrical member.

6. A wear button for insertion into a through bore extending between a first surface and a second surface of a guillotine blade, said wear button comprising:

a. a first portion comprising a first lip and a neck having a distal end and a proximal end, said neck tapering from a larger diameter at its distal end to a smaller diameter at its proximal end, wherein said first portion is inserted into the through bore such that said neck extends into the through bore and said first lip is adjacent the first surface of the guillotine blade; and b. a second portion comprising a second lip and a cylindrical member having a distal end and a proximal end, said cylindrical member defining a recess therein in which said recess tapers along the length of said cylindrical member from a smaller diameter at the distal end of said cylindrical member to a larger diameter at the proximal end of said cylindrical member, wherein said second portion is inserted into the through bore such that said second lip is adjacent the second surface of the guillotine blade and said cylindrical member extends into the through bore such that the recess defined within said second portion receives said neck.

7. The wear button of claim 6 further comprising a first gasket disposed between the first surface of the blade and said first lip of said first portion.

8. The wear button of claim 6 further comprising a second gasket disposed between the second surface of the blade and said second lip of said second portion.

9. A guillotine blade assembly for use within a cheese block former, said blade assembly comprising:

a. guillotine blade having a cutting edge, a first edge, a second edge, an upper surface and a lower surface, wherein said first and second edges are each provided with at least one through bore extending between said upper and lower surfaces; and b. a wear button disposed in each of said through bores, each wear button comprising:

(1). a first portion comprising a lip and a neck having a distal end and a proximal end, said neck tapering from a larger diameter at its distal end to a smaller diameter at its proximal end, wherein said first portion is inserted into said through bore at said lower surface of said blade such that said neck extends into said through bore and said lip abuts the lower surface of said blade; and (2) a second portion comprising a lip and a projection extending from said lip, said projection having a distal end and a proximal end and defining a recess within said projection, wherein said recess tapers from a smaller diameter at the distal end of said projection to a larger diameter at the proximal end of said projection, wherein said second portion is inserted into said through bore at said upper surface of said blade such that said projection extends into said through bore and said lip abuts the upper surface of said blade allowing the proximal end of said neck of said first portion to seat in the recess defined within said second portion.

10. A wear strip comprising:

a. a first elongated portion comprising a lip and a neck extending at least partially along the length of said first portion, said neck projecting out from said lip and having distal end and a proximal end, said neck tapering from a larger width at its distal end to a smaller width at its proximal end; and b. a second elongated portion comprising a lip and a projecting member extending at least partially along the length of said lip, said member having a distal end and a proximal end, and said member defining a recess therein in which said recess tapers from a smaller width at the distal end of said member to a larger width at the proximal end of said member, wherein the proximal end of said neck of said first portion seats in the recess defined within said second portion.

* * * * *